United States Patent Office 2,863,863
Patented Dec. 9, 1958

2,863,863
MERCURATION PRODUCTS OF 1-PYRIDYL-3-ALLYLUREAS

John H. Biel, Milwaukee, Wis., assignor to Lakeside Laboratories, Inc., a corporation of Wisconsin No Drawing. Application June 4, 1956
Serial No. 588,999

9 Claims. (Cl. 260—242)

This invention relates to novel chemical compounds and processes of preparing the same. More particularly, this invention is concerned with novel organic derivatives of mercury.

According to the present invention there is provided novel compounds of the formula:

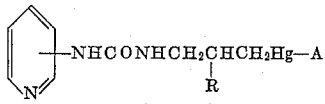

wherein A is an acyloxy, a halogen, a hydroxyl group, or the residue of an acidic nitrogen compound having a replaceable hydrogen on the nitrogen atom such as theophylline, theobromine, succinimide and phthalimide residues remaining after the hydrogen on the nitrogen atom has been replaced so that the nitrogen is directly bonded to the mercury atom, and R is hydroxyl or a lower alkoxy group, and acid addition and quaternary ammonium salts thereof, and intermediates and processes useful in producing such compounds.

Those compounds in which A is acyloxy may be produced by reacting an aminopyridine with allyl isocyanate to produce a 1-pyridyl-3-allylurea and reacting said compound with an acyloxy mercury compound in water or a lower alcohol to produce a 1-pyridyl-3-(beta-hydroxy or alkoxy-gamma-acyloxymercuri propyl)-urea. This process may be represented as follows:

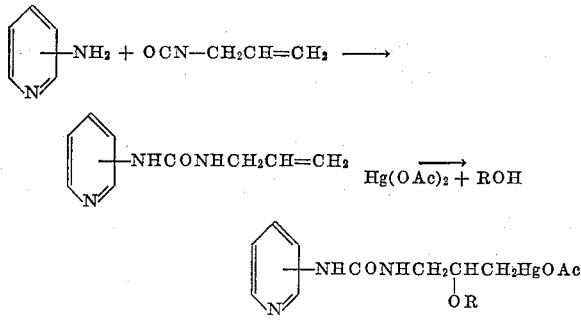

wherein R is hydrogen or alkyl and Ac is an acyl group.

Reaction between the aminopyridine and allyl isocyanate is conveniently effected in the presence of an inert dry organic solvent, preferably in which the reactants are soluble at the concentrations employed. Dry benzene, ether, cyclohexane and the like are representative solvents which may be employed. Increased temperatures such as the reflux temperature are employed to promote reaction and complete it without undue delay. After the reaction is terminated the product may be recovered by conventional procedures such as filtration, if it is insoluble in the solvent, or by evaporation of the reaction mixture to dryness.

The amino group may be present at the alpha, beta or gamma position of the pyridyl nucleus of the aminopyridine used in this reaction and the product formed will be the corresponding 1-(alpha-pyridyl)-3-allylurea, 1-(beta-pyridyl)-3-allylurea, or 1-(gamma-pyridyl)-3-allylurea.

As previously stated, the 1-pyridyl-3-allylurea intermediates are reacted with an acyloxy mercury in water or an alcohol to produce a 1-pyridyl-3-(beta-hydroxy or alkoxy-gamma-acyloxymercuri propyl)-urea. Acyloxy mercury compounds may be employed in this reaction in which the acyloxy group is derived from a lower monocarboxylic acid of at least two carbons, and preferably less than six carbons. Representative compounds which may be used are mercuric acetate, mercuric propionate, and mecuric butyrate.

The reaction is conveniently effected by contacting the reactants in water or a lower alcohol and heating the mixture, such as at the reflux temperature, until the reaction is essentially completed. When an alcohol is employed it is preferably a lower straight or branched chained alcohol, especially one of less than six carbons. After cooling, the mixture may be treated conventionally to recover the product.

With water as the solvent the compounds provided by this invention will have a beta-hydroxy group whereas with an alcohol a beta-alkoxy group will be introduced. Typical compounds which may be produced according to this invention are 1-beta-pyridyl-3-(gamma-acetoxy mercuri - beta - methoxypropyl) - urea, 1 - beta - pyridyl-3 - (gamma - propionoxymercuri - beta-ethoxy - propyl)-urea, 1 - alpha - pyridyl - (gamma - acetoxymercuri-beta-methoxypropyl)-urea, 1-gamma-pyridyl-3-(gamma-acetoxymercuri - beta - methoxypropyl)-urea, 1 - beta-pyridyl - 3 - (gamma - acetoxymercuri - beta - hydroxypropyl) - urea, 1 - beta - pyridyl - 3 - (gamma - propionoxymercuri-beta-hydroxypropyl)-urea and the like.

By contacting a 1-pyridyl-3-(beta-hydroxy or alkoxy-gamma-acyloxymercuri propyl)-urea with an alkali metal halide or alkaline earth metal halide the corresponding 1-pyridyl-3-(beta-hydroxy or alkoxy-gamma-halomercuri propyl)-urea may be formed. This reaction takes place readily in water at room temperature. The product may be separated as by filtration. Representative of the compounds so formed are 1-beta-pyridyl-3-(beta-hydroxy-gamma-chloromercuri propyl)-urea, 1-gamma-pyridyl-3-(beta - hydroxy - gamma - bromomercuri propyl) - urea, 1 - alpha - pyridyl - 3 - (beta - methoxy - gamma - chloromercuri propyl)-urea and 1-beta-pyridyl-3-(beta-ethoxy-gamma-bromomercuri propyl)-urea.

1-pyridyl-3-(beta-hydroxy or alkoxy-gamma-hydroxymercuri propyl)-urea compounds may be produced by contacting a 1-pyridyl-3-(beta-hydroxy or alkoxy-gamma-acyloxy mercuri propyl)-urea with an inorganic base, preferably an alkali metal hydroxide such as sodium hydroxide. The hydroxymercuri compounds also may be produced by contacting a halomercuri compound with an inorganic base. Some hydroxy mercuri compounds which may be produced are 1-beta-pyridyl-3-(beta-hydroxy-gamma-hydroxymercuri propyl)-urea, 1-alpha-pyridyl - 3 - (beta - methoxy - gamma - hydroxy - mercuri propyl) - urea, 1 - gamma - pyridyl - 3 - (beta - ethoxy-gamma-hydroxymercuri propyl)-urea and 1-beta-pyridyl-3-(beta-propoxy-gamma-hydroxymercuri propyl)-urea.

By reacting an acetoxymercuri, halomercuri or hydroxymercuri compound of this invention with an acidic nitrogen compound there is formed the corresponding salt in which the mercury atom is directly bonded to the nitrogen atom from which the hydrogen has been replaced. Acidic nitrogen compounds such as theobromine, theophylline, succinimide and phthalimide are representative of the compounds which may be so reacted.

Acid addition salts may be formed by contacting the compounds with a stoichiometric amount of a suitable acid such as a mineral acid like sulfuric acid or hydrochloric acid or organic acids like acetic acid and citric acid.

Quaternary ammonium salts may be produced by contacting such compounds with an alkyl or aralkyl ester of a mineral or organic acid, preferably in the presence of an aqueous organic solvent. Alkyl halides such as methyl chloride, ethyl bromide and the like and methyl sulfate are examples of reactants which form quaternary ammonium salts with these compounds.

These compounds are potent diuretic agents and are effective by all routes of administration; they are therefore valuable therapeutic agents for the treatment of congestive heart failure. Such compounds are preferably used at neutral pH.

The following examples are presented to illustrate methods of producing certain of the novel compounds included within this invention. It is understood, however, that these examples are included only for purposes of illustration, and that the invention is not to be restricted to the embodiments specifically disclosed therein.

EXAMPLE 1

*1 - (beta-pyridyl)-3-(beta-methoxy-gamma-acetoxymercuri-propyl)-urea*

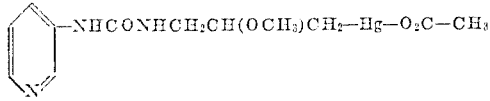

A mixture containing 6.3 g. (0.035 mole) of 1-(beta-pyridyl)-3-allylurea, 11.3 g. (0.035 mole) of mercuric acetate and 8.6 g. of glacial acetic acid in 100 cc. of methanol was refluxed with stirring for eight hours. The solution was clarified by filtration and concentrated to dryness in vacuo. The solid residue was suspended in n-hexane, yield 18.6 g.; M. P. 70° C. dec. After recrystallization from methyl ethyl ketone, yield 10 g. M. P. 123–125° C. A second recrystallization from methyl ethyl ketone raised the melting point to 126–128° C.

*Anal.*—Calcd. for $C_{12}H_{17}HgN_3O_4$: Hg, 42.20; N. 8.98. Found: Hg, 42.17, N, 8.77.

EXAMPLE 2

*1 - alpha-pyridyl-3-(beta-methoxy-gamma-chloromercuri propyl)-urea*

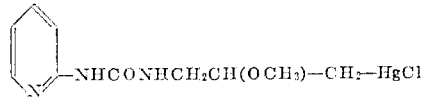

A solution containing 12.6 g. (0.070 mole) of 1-(alpha-pyridyl)-3-allylurea, 22.6 g. (0.070 mole) of mercuric acetate and 17.2 g. of glacial acetic acid in 200 cc. of methanol was stirred for six hours with reflux. The reaction mixture was concentrated in vacuo, the gummy residue dissolved in water and the aqueous solution neutralized by the addition of 25 g. of sodium bicarbonate. The aqueous mixture was extracted with chloroform, the chloroform extracts taken to dryness and the residue dissolved in 50 cc. of methanol. To the methanolic solution of the acetoxymercuri compound was added 5.0 g. of sodium chloride in 50 cc of water. An oily precipitate appeared; the water-methanol supernatant liquid was decanted and the oil crystallized from ethanol-water, yield 9.1 g., M. P. 166° C. dec.

*Anal.*—Calcd. for $C_{10}H_{14}HgClN_3O_2$: Hg, 45.25; N, 9.46; Cl, 8.00. Found: Hg, 40.51; N, 9.20; Cl, 8.13.

EXAMPLE 3

*1 - (gamma-pyridyl)-3 - (beta-methoxy-gamma-chloromercuri-propyl)-urea*

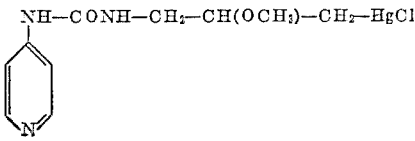

This compound was prepared from 1-(gamma-pyridyl)-3-allylurea in the manner described under Example 2, M. P. 138° C. dec.

*Anal.*—Calcd. for $C_{10}H_{14}ClHgN_3O_2$: Hg, 45.25; N, 9.46; Cl, 8.00. Found: Hg, 41.54; N, 8.81; Cl, 7.40.

EXAMPLE 4

*1 - (beta-pyridyl)-3 - (beta-hydroxy-gamma-chloromercuri-propyl)-urea acetate*

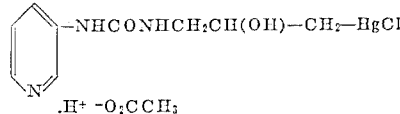

A mixture containing 6.3 g. (0.035 mole) of 1-(beta-pyridyl)-3-allylurea, 11.3 g. (0.035 mole) of mercuric acetate and 8.6 g. of glacial acetic acid and 100 cc. of water was refluxed for eight hours. The solution was boiled with 5.0 g. of activated charcoal for one-half hour and clarified by filtration.

To the filtrate containing 1-(beta-pyridyl)-3-(beta-hydroxy propyl-gamma-acetoxymercuri)-urea was added 2.2 g. of sodium chloride. A small amount of water-insoluble precipitate was removed by filtration and the filtrate was concentrated to dryness. The residue was crystallized from isopropyl alcohol and the solid re-suspended twice from isopropyl alcohol. Yield 2.6 g.; M. P. 147° C. dec.

*Anal.*—Calcd. for $C_{11}H_{16}HgClN_3O_4$: Hg, 41.0. Found: Hg, 41.04.

EXAMPLE 5

*1 - (beta-pyridyl)-3-(beta-hydroxy-gamma-bromomercuri-propyl)-urea*

This compound was prepared by the addition of sodium bromide to an aqueous solution of the acetoxymercuri compound in Example 4. M. P. 108° C. dec.

*Anal.*—Calcd. for $C_9H_{12}BrHgN_3O_2$: Hg, 42.3. Found: Hg, 41.2.

EXAMPLE 6

*1 - (beta-pyridyl)-3-(beta-methoxy-gamma-chloromercuri-propyl)-urea*

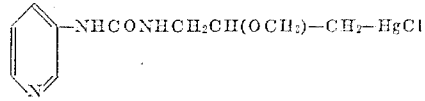

To 4.7 g. (0.010 mole) of the acetoxymercuri compound of Example 1 dissolved in 50 cc. of water was added 0.6 g. of sodium chloride in 5 cc. of water. A gummy precipitate resulted which was crystallized from 50 cc. of acetone. The product was isolated by filtration. Yield 3.6 g., M. P. 181–182° C.

*Anal.*—Calcd. for $C_{10}H_{14}HgClN_3O_4$: Hg, 46.2; N, 9.46; Cl, 8.00. Found: Hg, 45.0; N, 9.38; Cl, 8.10.

EXAMPLE 7

*1-(beta-pyridyl)-3-[gamma-(7-theophyllino)-mercuri-beta-methoxy-propyl]-urea*

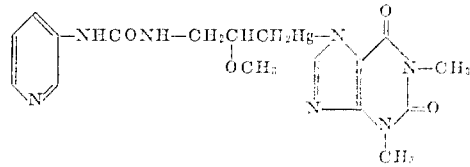

To 2.4 g. (0.005 mole) of the acetoxymercuri compound of Example 1 suspended in 25 cc. of methanol was added 0.9 g. (0.005 mole) of theophylline monohydrate. On warming, a clear solution resulted which was followed by the crystallization of a white precipitate. The product was separated by filtration. Yield 2.6 g., M. P. 232–233° C. dec.

*Anal.*—Calcd. for $C_{17}H_{21}HgN_7O_4$: Hg, 34.1; N, 16.66. Found: Hg, 32.94; N, 16.39.

Various changes and modifications of the invention can be made and, to the extent that such variations incorporate the spirit of this invention, they are intended to be included within the scope of the appended claims.

What is claimed is:

1. A member of the group consisting of compounds of the formula

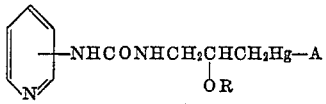

wherein A is a member of the group consisting of hydroxy, halo, acyloxy groups derived from aliphatic hydrocarbon monocarboxylic acids of more than one carbon and less than six carbons and groups derived from the acidic nitrogen compounds theobromine, theophylline, succinimide and phthalimide by removal of the hydrogen on the nitrogen atom, R is a member of the group consisting of hydrogen and lower alkyl groups, and stable non-toxic acid addition and quaternary ammonium salts thereof.

2. 1-pyridyl-3-(beta-lower alkoxy-gamma-acyloxymercuri propyl)-urea, wherein the acyloxy is derived from an aliphatic hydrocarbon monocarboxylic acid of more than one carbon and less than six carbons.

3. 1 - pyridyl - 3 - (beta-hydroxy - gamma - acyloxymercuri propyl)-urea wherein the acyloxy is derived from an aliphatic hydrocarbon monocarboxylic acid of more than one carbon and less than six carbons.

4. 1-pyridyl-3-(beta-lower alkoxy-gamma-halomercuri propyl)-urea.

5. 1 - (beta - pyridyl) - 3 - (beta - methoxy - gamma-acetoxymercuri propyl)-urea.

6. 1 - (beta - pyridyl) - 3 - (beta - hydroxy - gamma-chloromercuri propyl)-urea.

7. 1 - (beta - pyridyl) - 3 - (beta - methoxy - gamma-chloromercuri propyl)-urea.

8. 1 - pyridyl - 3 - [gamma - (7 - theophyllino) - mercuri-beta-lower alkoxy-propyl]-urea.

9. 1 - (beta - pyridyl) - 3 - [gamma - (7 - theophyllino)-mercuri-beta-methoxy-propyl]-urea.

References Cited in the file of this patent
UNITED STATES PATENTS 2,136,501    Hartmann et al. _____ Nov. 15, 1938

OTHER REFERENCES

Rowland et al.: J. Am. Chem. Soc., vol. 72–73, pp. 3595–7, pp. 3691–3.

Davis et al.: J. Am. Chem. Soc., vol. 56, pp. 885–6 (1934).

Feist et al.: Chem. Abstracts, vol. 28, col. 3408 (1934).

Cavallaro et al.: C. A., vol. 43, col. 548 (1949).

UNITED STATES PATENT OFFICE

CERTIFICATE OF CORRECTION

Patent No. 2,863,863                      December 9, 1958

John H. Biel

It is hereby certified that error appears in the printed specification of the above numbered patent requiring correction and that the said Letters Patent should read as corrected below.

Column 2, line 12, for "mecuric" read -- mercuric --; line 29, for "-(gamma-" read -- -3-(gamma- --; column 3, line 31, after "pyridyl" and before the hyphen insert a closing parenthesis.

Signed and sealed this 9th day of June 1959.

(SEAL)
Attest:

KARL H. AXLINE                                ROBERT C. WATSON
Attesting Officer                              Commissioner of Patents